(12) United States Patent
Nakamura (10) Patent No.: US 6,847,131 B2
(45) Date of Patent: Jan. 25, 2005

(54) POWER SUPPLY DEVICE AND ELECTRONIC EQUIPMENT

(75) Inventor: Toshiya Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 366 days.

(21) Appl. No.: 10/016,603

(22) Filed: Oct. 30, 2001

(65) Prior Publication Data

US 2002/0089233 A1 Jul. 11, 2002

(30) Foreign Application Priority Data

Oct. 31, 2000 (JP) ........................................ 2000-333570

(51) Int. Cl.[7] .................................................. H02J 1/00
(52) U.S. Cl. .............................. 307/85; 307/31; 307/64; 307/66
(58) Field of Search ............................. 307/64, 66, 85, 307/31

(56) References Cited

U.S. PATENT DOCUMENTS 4,360,853 A * 11/1982 Welk .......................... 361/115
4,441,148 A * 4/1984 Hirata ......................... 363/54
5,811,895 A * 9/1998 Suzuki et al. ................ 307/125
6,351,401 B1 * 2/2002 Scheel et al. .................. 363/98
6,597,074 B2 * 7/2003 Tsujikado et al. ............. 307/66

* cited by examiner

Primary Examiner—Robert L. DeBeradinis
(74) Attorney, Agent, or Firm—Frommer Lawrence & Haug LLP; William S. Frommer (57) ABSTRACT

A power supply device is presented which can provide a sufficiently long ending process time to an electronic equipment connected thereto even if an input voltage is disconnected abnormally and reduces the circuit area and the power consumption. The power supply device includes a switching power supply section for receiving a DC voltage as an input voltage at a primary side, switching the inputted DC voltage and generating a stabilized output DC voltage at a secondary side isolated from the primary side, a current detection section for generating a synchronization pulse synchronized with supply current to the switching power supply section, and a control section for outputting a detection pulse to convey disconnection of an AC input to the switching power supply section to the electronic equipment side based on the synchronization pulse.

2 Claims, 7 Drawing Sheets

POWER SUPPLY DEVICE AND ELECTRONIC EQUIPMENT

BACKGROUND OF THE INVENTION

This invention relates to a power supply device having a function of notifying an electronic equipment of the secondary side that input power to the primary side is disconnected abnormally, for example, by service interruption, disconnection of a power supply cable or compulsory disconnection by means of a breaker.

An electronic equipment which operates with an AC (alternating current) power supply like power supply for domestic use such as, for example, a television set, a video apparatus, an audio apparatus or a personal computer normally includes an AC-DC power supply device for converting AC power supply into DC (direct current) power supply in order to allow operation of an internal control circuit and so forth.

An electronic equipment of the type described sometimes suffers from abnormal disconnection wherein inputted AC power supply is disconnected suddenly during use thereof because of "pulling out of a plug for AC power supply", "compulsory disconnection of AC power supply by means of a breaker" or "occurrence of service interruption".

If such abnormal disconnection of AC power supply occurs in an electronic equipment which requires storage or backup of process data upon disconnection of power supply such as, for example, a personal computer or a digital television receiver, then the electronic equipment may not be able to perform an ending process such as storage or backup of process data, and there is the possibility that it may suffer from a failure or incomplete operation after the abnormal disconnection.

Therefore, a power supply device for use with an electronic equipment of the type described normally includes an abnormal disconnection detection circuit which detects a power drop state of the secondary side, estimates that abnormal disconnection may occur and stop the supply of power and notifies the equipment of the estimated stop of power supply. Since the power supply device includes an abnormal disconnection detection circuit of the type just described, the electronic equipment can perform an ending process such as storage or backup of process data into a non-volatile memory before the power supplied to the secondary side stops completely and consequently can prevent an otherwise possible failure or incomplete operation caused by such abnormal disconnection.

A first related art power supply device which includes a detection circuit for detecting abnormal disconnection is described.

Figure 4:
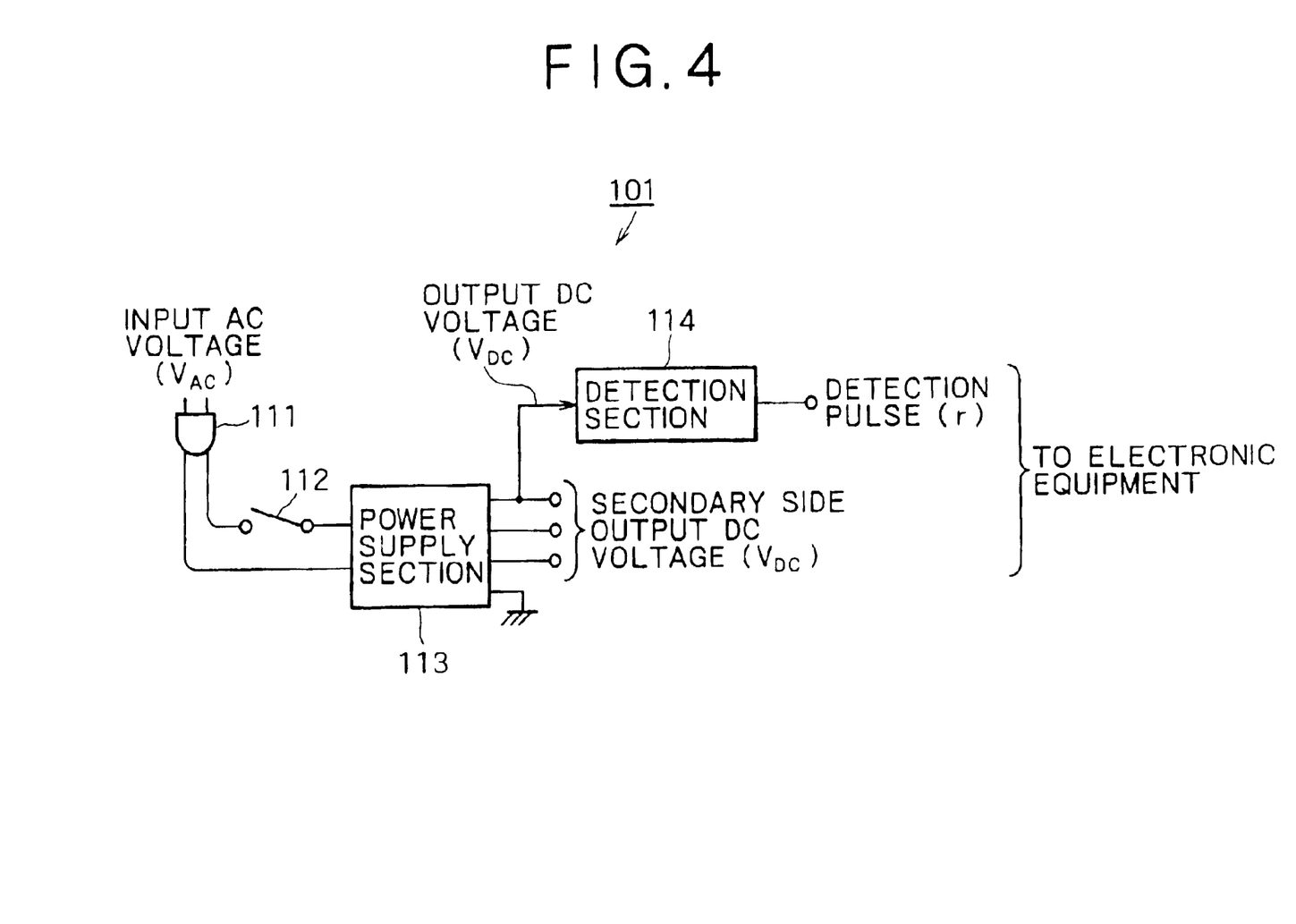
FIG. 4 is a block diagram showing a first related art power supply device.

A configuration of the first related art power supply device is shown in FIG. 4.

The related art power supply device 101 includes an input terminal 111 for receiving, for example, a domestic input AC voltage ($V_{AC}$), an inputting switch 112 for performing switching on/off of the AC input, a power supply section 113 for converting the input AC voltage ($V_{AC}$) into a stabilized DC voltage (output DC voltage: $V_{DC}$), and a detection section 114 for detecting abnormal disconnection of the AC input. The first related art power supply device 101 just described converts the input AC voltage ($V_{AC}$) supplied as domestic power thereto into the stabilized output DC voltage ($V_{DC}$) and can supply the stabilized output DC voltage ($V_{DC}$) to an electronic equipment, in the following stage, such as a personal computer, a digital TV receiver or the like.

The detection section 114 monitors a secondary side output DC voltage ($V_{DC}$) outputted from the power supply section 113. If the secondary side output DC voltage ($V_{DC}$) drops, that is, if abnormal disconnection occurs, then the detection section 114 turns ON a detection pulse (r) and notifies an electronic equipment in the following stage of the abnormal disconnection.

Figure 5:
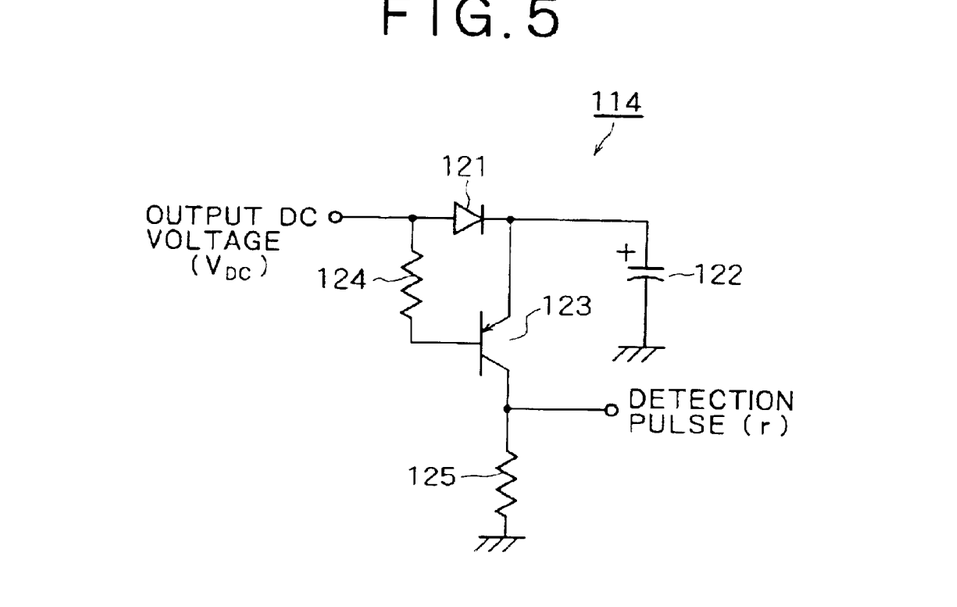
FIG. 5 is a circuit diagram of a detection section of the related art power supply device of FIG. 4.

For example, the detection section 114 can be implemented with such a circuit as shown in FIG. 5. The detection section 114 is formed from a diode 121 which receives, at the anode thereof, the output DC voltage ($V_{DC}$) from the power supply section 113, a capacitor 122 whose one end is connected to the cathode of the diode 121 while the other end is connected to the ground, a pnp transistor 123 whose emitter is connected to the cathode of the diode 121, a first resistor 124 whose one end is connected to the anode of the diode 121 while the other end is connected to the base of the pnp transistor 123, and a second resistor 125 whose one end is connected to the collector of the pnp transistor 123 while the other end is connected to the ground.

The detection section 114 having such a configuration a described above generates the detection pulse (r) from the collector of the pnp transistor 123. The detection pulse (r) exhibits ( ) (volt) in a steady state wherein the output DC voltage ($V_{DC}$) is stabilized. If the output DC voltage ($V_{DC}$) drops by a predetermined voltage ($\Delta V$) from the voltage of the steady state, then the detection pulse (r) rises up to the predetermined voltage and turns ON.

Figure 6:
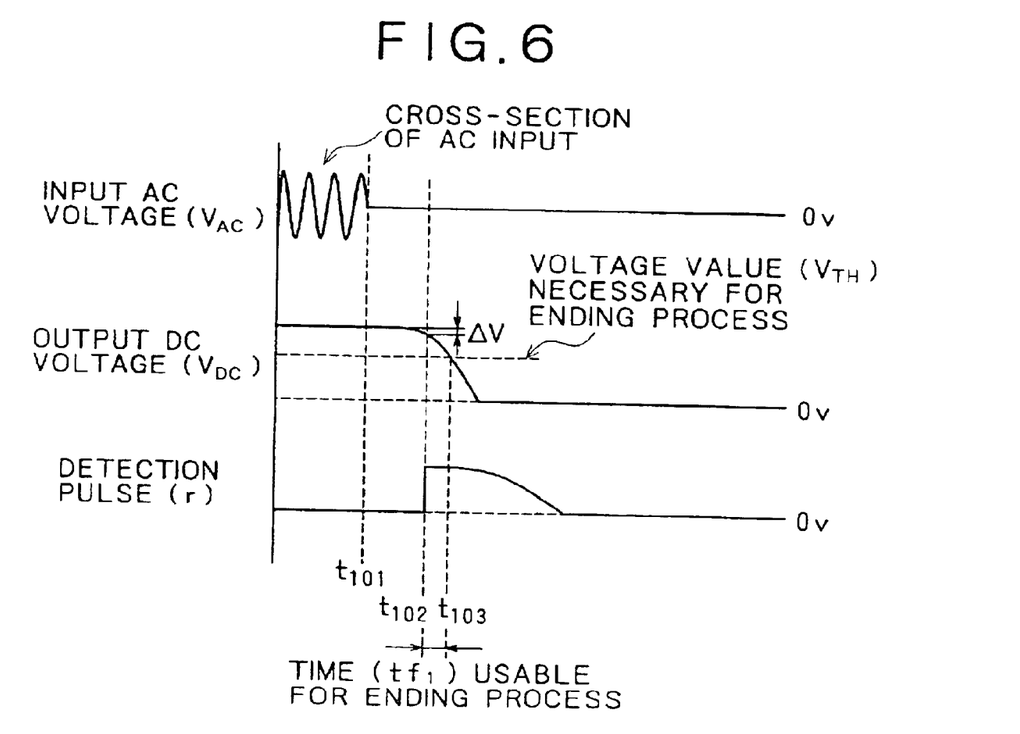
FIG. 6 is a diagram showing waveforms of voltages inputted to and outputted from the first related art power supply device of FIG. 4 and a waveform of a detection pulse generated by the power supply circuit.

Operation of the first related art power supply device 101 is described with reference to FIG. 6.

Since the power supply device 101 holds, at the power supply section 113 thereof, residual power after the input AC voltage ($V_{AC}$) stops (at time $t_{101}$), the output DC voltage ($V_{DC}$) is continuously outputted to the secondary side for a while. If the residual power decreases, then dropping of the output DC voltage ($V_{DC}$) is started. Here, if the output DC voltage ($V_{DC}$) drops by the predetermined voltage ($\Delta V$) from the voltage of the steady state (at time $t_{102}$), then the pnp transistor 123 of the detection section 114 turns ON and the detection pulse (r) turns ON. The detection pulse (r) is conveyed to the electronic equipment side. The electronic equipment performs an ending process including storage or backup of process data or the like when the detection pulse (r) turns ON.

The first related art power supply device 101 having such a configuration as described above monitors a voltage dropping state of the secondary side output DC voltage ($V_{DC}$) of the power supply section 113 and notifies the electronic equipment side of the state. Consequently, in the power supply device 101, the time ($tf_1$) which can be used for an ending process from time ($t_{102}$) at which the detection pulse (r) turns ON to time ($t_{103}$) at which a voltage value ($V_{TH}$) necessary for performing the ending process is obtained is very short. Consequently, it is difficult that the first related art power supply device 101 is used for an electronic equipment such as a personal computer or a digital broadcast receiver, wherein an ending process time is relatively long.

Generally, an AC-DC power supply device of the switching inverter type is used as a power supply device for use with an electronic equipment. In the power supply device of the switching inverter type, since the residual power held therein is high and the power conversion efficiency is high, the residual time within which the secondary side output DC voltage continues to be outputted is long after the AC input is disconnected. Consequently, if abnormal disconnection of the AC input is detected more quickly, then the time which can be used for the ending process by the electronic equipment can be extended longer.

A second related art power supply device of the switching inverter type which includes a detection section which can detect such abnormal disconnection of the AC input as described above more quickly is described.

Figure 7:
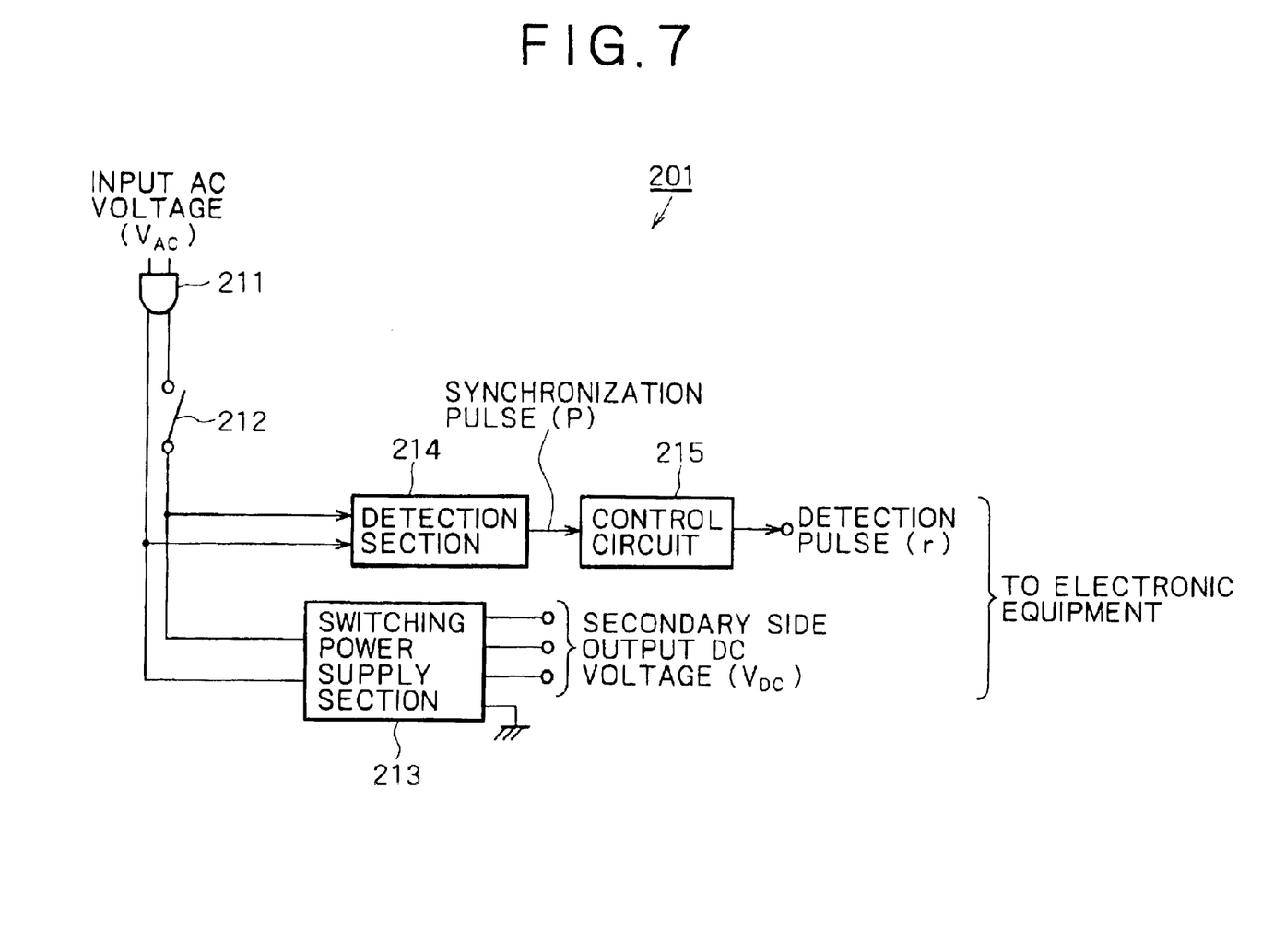
FIG. 7 is a block diagram showing a second related art power supply device.

A configuration of the related art power supply device of the switching inverter type is shown in FIG. 7.

Referring to FIG. 7, the related art power supply device 201 shown includes an input terminal 211 to which, for example, a domestic input AC voltage ($V_{AC}$) is inputted, an inputting switch 212 for switching on/off the AC input, a switching power supply section 213 for converting the input AC voltage ($V_{AC}$) into a stabilized DC voltage (output DC voltage: $V_{DC}$), a synchronism detection section 214 for generating a synchronization pulse (P) synchronized with the input AC voltage ($V_{AC}$), and a control section 215 for detecting abnormal disconnection of the AC input based on the synchronization pulse (P) generated from the synchronism detection section 214.

Though not shown, the switching power supply section 213 includes a rectification circuit which rectifies, for example, the input AC voltage ($V_{AC}$) into a DC voltage once, a transformer wherein the DC voltage outputted from the rectification circuit is inputted to the primary side coil, a smoothing circuit for smoothing an output voltage from the secondary side coil of the transformer, and a switching circuit which performs switching of input current supplied to the primary side coil.

The switching power supply section 213 having such a configuration as just described performs, for example, PWM (Pulse Width Modulation) control of switching in response to a voltage value of the secondary side output DC voltage ($V_{DC}$) so that the secondary side output DC voltage ($V_{DC}$) may be stabilized. The second related art power supply device 201 having such a configuration as described above can convert the input AC voltage ($V_{AC}$) supplied thereto as domestic power into the stabilized output DC voltage ($V_{DC}$) and supply it to an electronic equipment including a personal computer, or a digital TV receiver.

The detection section 214 detects the input AC voltage ($V_{AC}$) inputted thereto from the input terminal 211 and generates the synchronization pulse (P) synchronized with the input AC voltage ($V_{AC}$). The control section 215 monitors the synchronization pulse (P) outputted from the detection section 214 and generates a detection pulse (r) to be conveyed to the electronic equipment in the following stage when the generation of the synchronization pulse (P) stops for more than a predetermined period of time.

Figure 8:
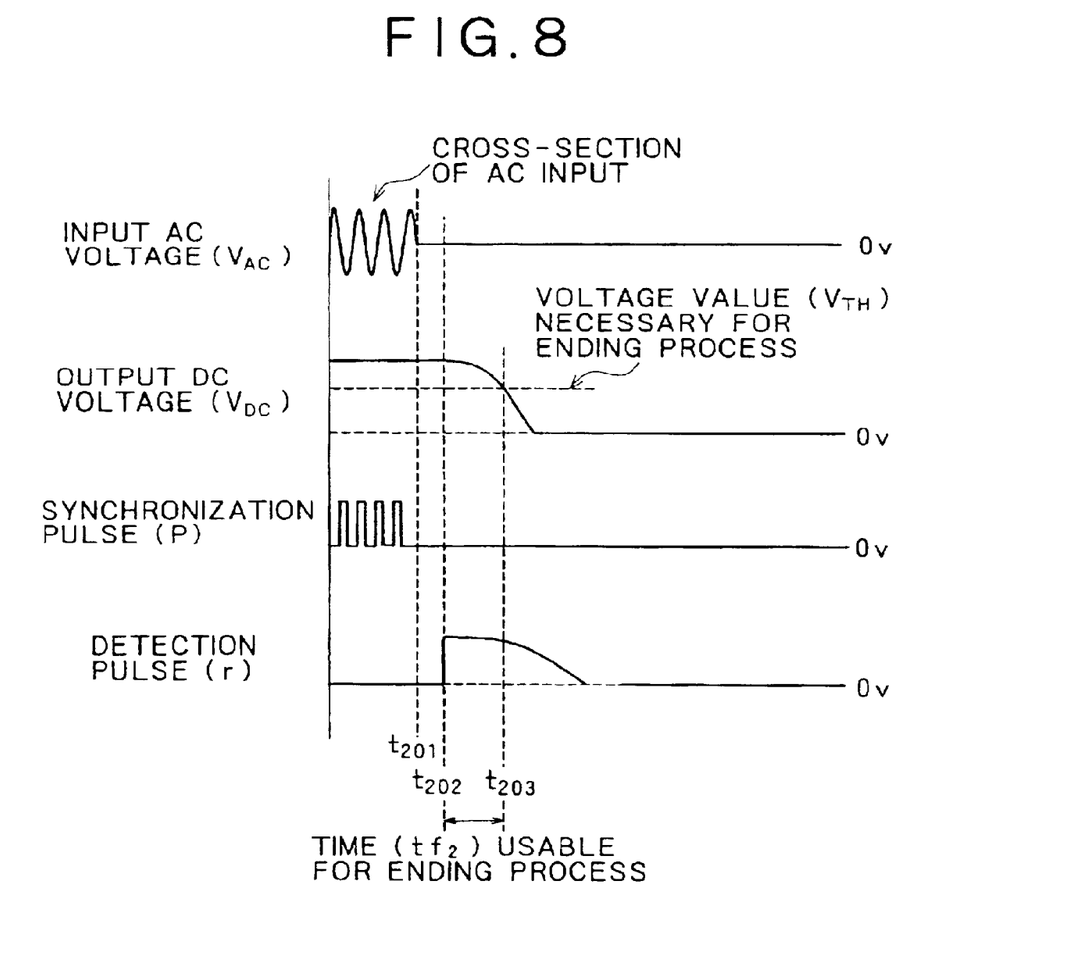
FIG. 8 is a diagram showing waveforms of voltages inputted to and outputted from the second related art power supply device of FIG. 7 and waveforms of a detection pulse and a synchronization pulse generated by the power supply device.

Operation of the second related art power supply device 201 is described with reference to FIG. 8.

The detection section 214 generates a pulse synchronized with the input AC voltage ($V_{AC}$). Accordingly, upon steady operation, the synchronization pulse (P) which has a frequency of, for example, 60 Hz is generated from the detection section 214.

If the input AC voltage ($V_{AC}$) is disconnected abnormally (at time $t_{201}$), also the generation of the synchronization pulse (P) stops. However, since residual power is held in the power supply section 213 also after the supply of the input AC voltage ($V_{AC}$) stops, the output DC voltage ($V_{DC}$) continues to be outputted to the secondary side for a little while. If the predetermined time ($\Delta t$) passes after the stop of the generation of the synchronization pulse (P), then the control section 215 turns ON the detection pulse (r). The detection pulse (r) is conveyed to the electronic equipment side. When the detection pulse (r) turns ON, the electronic equipment performs an ending process such as storage or backup of process data.

Accordingly, different from the First related art power supply device 101 described above, the second related art power supply device 201 directly monitors the input AC voltage ($V_{AC}$) and discriminates whether or not the input AC voltage ($V_{AC}$) is disconnected abnormally. Consequently, the second related art power supply device 201 can convey the abnormal disconnection to the electronic equipment side before the output of the DC voltage ($V_{DC}$) drops. Therefore, the abnormal disconnection can be conveyed more quickly than the first related art power supply device 101. Consequently, in the second related art power supply device 201, the time ($tf_2$) which can be used for the ending process by the electronic equipment from the time ($t_{202}$) at which the detection pulse (r) turns ON to the time ($t_{203}$) at which the voltage value ($V_{TH}$) necessary for performing the ending process is obtained can be made longer. Further, the second related art power supply device 201 can cope with an electronic equipment including a personal computer or a digital broadcast receiver, wherein the ending process time is relatively long.

However, in a power supply device of the switching inverter type, the primary side and the secondary side must be isolated from each other in order to assure the safety. Therefore, the input AC voltage ($V_{AC}$) inputted to the detection section 214 and the synchronization pulse (P) outputted from the detection section 214 must be signals isolated from each other in terms of the circuit. Therefore, in the second related art power supply device 201, a transformer must be provided in the detection section 214 to isolate the input AC voltage ($V_{AC}$) and the synchronization pulse (P) from each other, resulting in increased circuit area. Further, even if, for example, a photo-coupler or the like is used in place of a transformer, since the photo-coupler itself must be driven with DC, high power loss occurs with voltage conversion for the AC/DC conversion.

SUMMARY OF THE INVENTION

It is an object of the present invention to provide a power supply device which can provide a sufficiently long ending process time to an electronic equipment connected thereto even if an input voltage is disconnected abnormally and reduces the circuit area and the power consumption.

It is another object of the present invention to provide an electronic equipment which can have a sufficiently long ending process time even if an input voltage is disconnected abnormally and reduces the circuit area and the power consumption.

In order to attain the objects described above, according to an aspect of the present invention, there is provided a power supply device, including a switching power supply section for receiving a DC voltage as an input voltage at a primary side thereof, switching the inputted DC voltage and generating a stabilized output DC voltage at a secondary side thereof isolated from the primary side, and a current detection section for generating a detection signal in response to supply current to the switching power supply section, the current detection section generating the detection signal isolated from the primary side and conveying the detection signal to an equipment connected to the secondary side of the switching power supply section.

In the power supply device, a detection signal is generated in accordance with DC supply current supplied to the switching power supply section from the outside. The detection signal is isolated from the primary side and conveyed to the equipment connected to the secondary side of the switching power supply section.

According to another aspect of the present invention, there is provided an electronic equipment, including a switching power supply section for receiving a DC voltage as an input voltage at a primary side thereof, switching the inputted DC voltage and generating a stabilized output DC voltage at a secondary side thereof isolated from the primary side, a current detection section for generating a detection signal in response to supply current to the switching power supply section, an operation circuit for operating using the output DC voltage outputted from the switching power supply section as a voltage source, and a control section for operating using the output DC voltage outputted from the switching power supply section as a voltage source to control the operation circuit, the current detection section generating the detection signal isolated from the primary side and conveying the detection signal to the control section, the control section performing an operation ending process of the operation circuit in response to the detection signal.

In the electronic equipment, a detection signal is generated in accordance with DC supply current supplied to the switching power supply section from the outside. The detection signal is isolated from the primary side and conveyed to the control section. The control section performs an operation ending process for the operation circuit in response to the detection signal.

Accordingly, with the power supply device and the electronic equipment, since an abnormal disconnection state of input power is discriminated based on current supplied to the switching power supply section, even if the input power is disconnected abnormally, a sufficiently long ending process time can be provided. Further, since the detection signal is generated based on the DC supply current, the isolation can be achieved by means of an isolation circuit of a simple configuration such as, for example, an isolation circuit formed from a photo-diode and a phototransistor. Consequently, with the power supply device, the circuit area and the power consumption can be reduced.

The above and other objects, features and advantages of the present invention will become apparent from the following description and the appended claims, taken in conjunction with the accompanying drawings in which like parts or elements denoted by like reference symbols.

BRIEF DESCRIPTION OF THE PREFERRED EMBODIMENT

Figure 1:
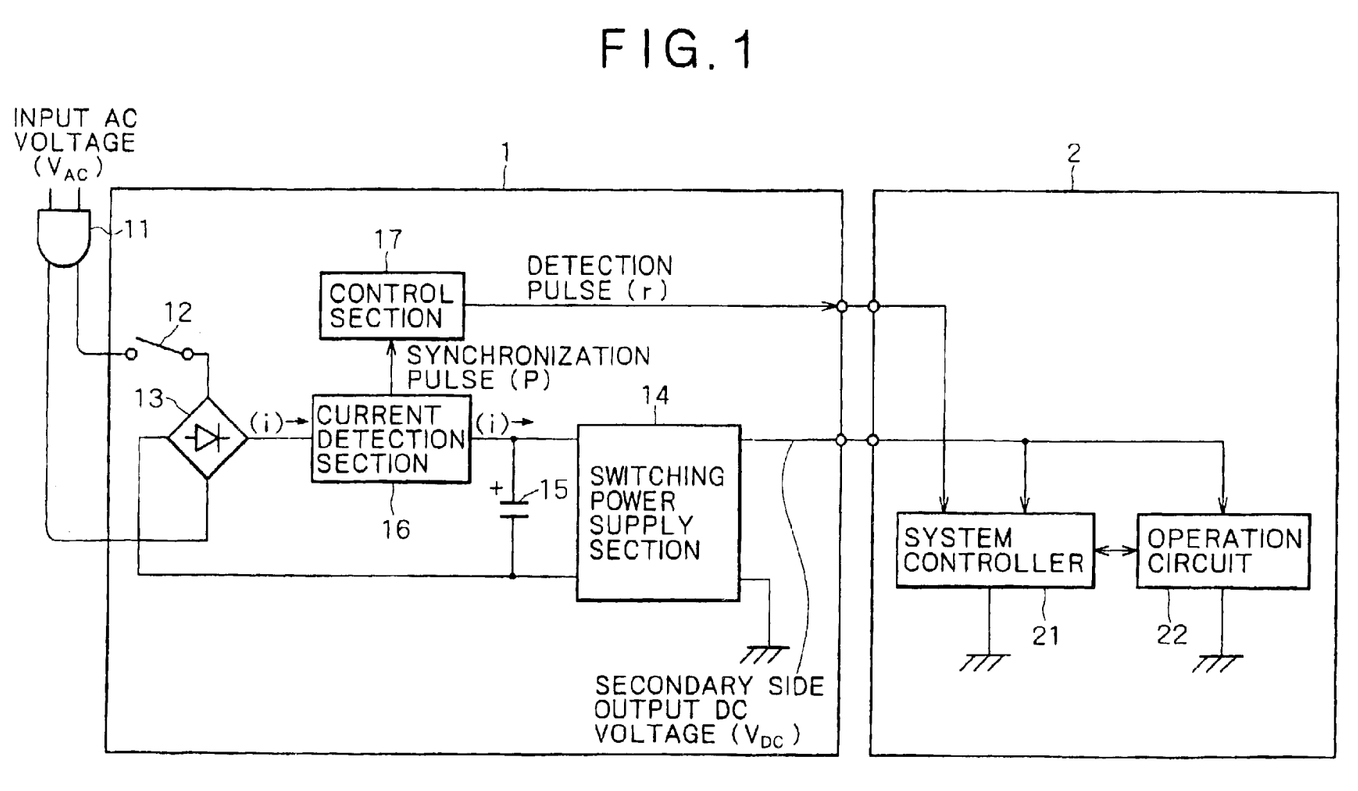
FIG. 1 is a block diagram of a power supply device to which the present invention is applied and an electronic equipment to which DC power is supplied from the power supply device.

Referring to FIG. 1, there is shown a configuration of a power supply device to which the present invention is applied. The power supply device 1 shown is designed as a device to which, for example, a domestic AC voltage is inputted and which converts the inputted AC voltage into a stabilized predetermined DC voltage. The DC voltage outputted from the power supply device 1 is supplied to an electronic equipment 2 and is used as a DC power supply for the electronic equipment 2. It is to be noted that, although the power supply device 1 and the electronic equipment 2 are shown as separate devices, the power supply device 1 may be built in the electronic equipment 2.

The power supply device 1 includes an input terminal 11 to which a domestic input AC voltage ($V_{AC}$) is inputted, an inputting switch 12 for performing switching on/off of the AC input, a rectification section 13 for rectifying the input AC voltage ($V_{AC}$) inputted through the input terminal 11, a switching power supply section 14 for converting a voltage obtained by the rectification section 13 into a stabilized DC voltage (output DC voltage: $V_{DC}$), a primary side capacitor 15 provided on the primary side of the switching power supply section 14, a current detection section 16 for detecting supply current (i) supplied from the rectification section 13 to the switching power supply section 14, and a control section 17 for detecting abnormal disconnection of the AC input based on the synchronization pulse (P) generated from the current detection section 16.

The electronic equipment 2 includes a system controller 21 to which the output DC voltage ($V_{DC}$) outputted from the power supply device 1 is supplied as power supply, and several operation circuits 22 (only one is shown).

The rectification section 13 rectifies the input AC voltage ($V_{AC}$) inputted thereto through the input terminal 11. The rectified input voltage is supplied to the switching power supply section 14 through the current detection section 16.

The switching power supply section 14 includes a transformer where the DC voltage from the rectification section 13 is inputted to the primary side coil thereof, a smoothing circuit for smoothing the output voltage of the secondary side coil of the transformer, a switching circuit for switching current (i) flowing to the primary side coil, a control circuit for PWM (Pulse Width Modulation) controlling the switching circuit. In the switching power supply section 14, the current (i) flowing to the primary side coil of the transformer is switched by the switching circuit, and current is excited in the secondary side coil of the transformer. Then, a voltage generated in the secondary side coil of the transformer is smoothed by the smoothing circuit and outputted as an output DC voltage ($V_{DC}$). In the switching power supply section 14, the voltage value of the output DC voltage ($V_{DC}$) of the secondary side is compared with a predetermined reference voltage, and a difference value between them is fed back in an isolated condition to the control circuit for the primary side. The control circuit PWM-controls the switching circuit in accordance with the difference value so that the output DC voltage ($V_{DC}$) of the secondary side may be stabilized at a fixed voltage.

In this manner, the switching power supply section 14 switches the voltage inputted to the primary side coil of the transformer to excite current in the secondary side isolated from the primary side coil thereby to generate the stabilized output DC voltage ($V_{DC}$).

The primary side capacitor 15 functions as a smoothing capacitor for smoothing the voltage outputted from the rectification section 13.

The current detection section 16 detects the current (i) flowing from the rectification section 13 to the switching power supply section 14 and generates a synchronization pulse (P) corresponding to the detected current (i). The synchronization pulse (P) generated from the current detection section 16 is outputted in an isolated condition from the primary side coil of the transformer of the switching power supply section 14 by means of a photo-coupler.

Figure 2:
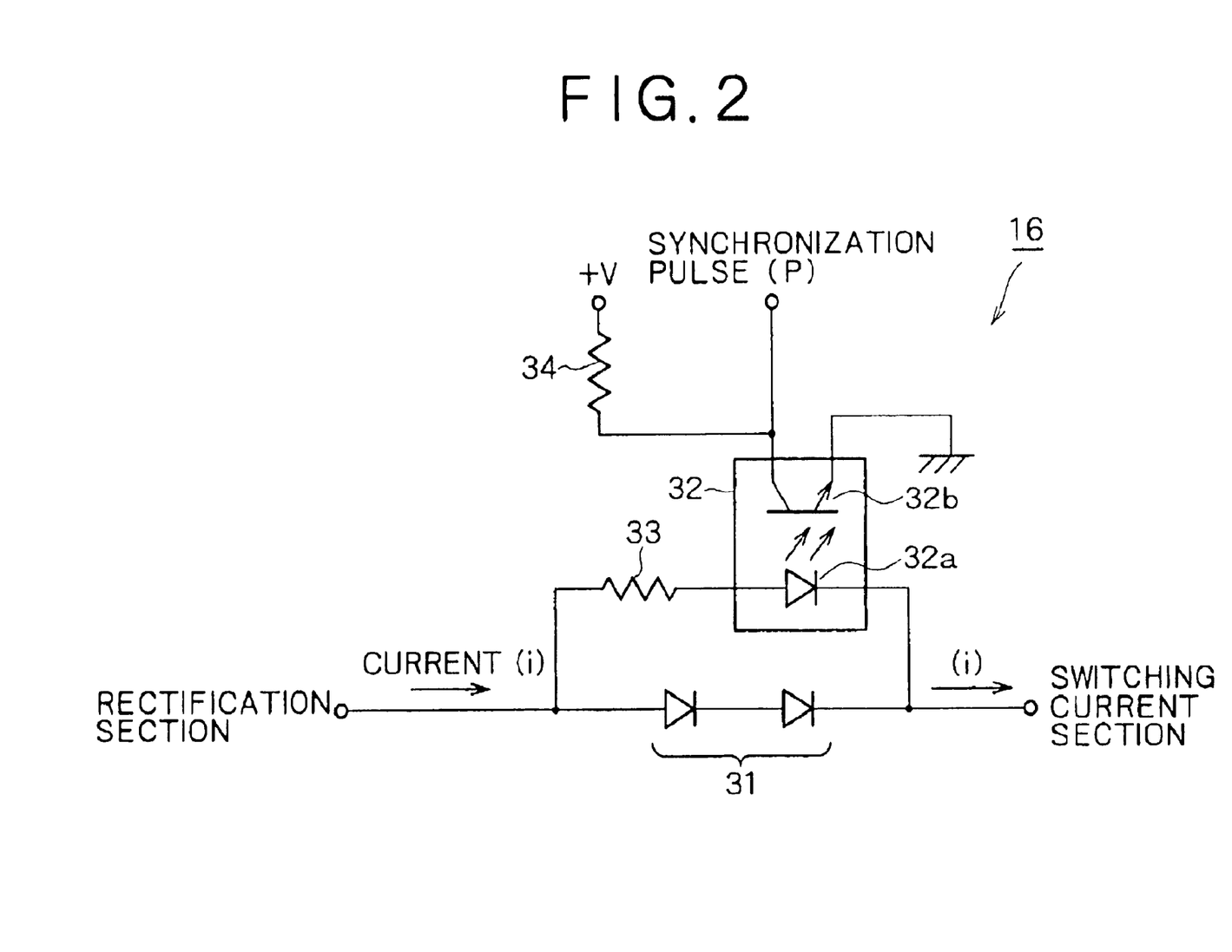
FIG. 2 is a circuit diagram of a current detection section of the power supply device shown in FIG. 1.

A detailed circuit configuration of the current detection section 16 is shown in FIG. 2.

The current detection section 16 includes, for example, as shown in FIG. 2, a current detecting diode (or diodes) 31, a photo-coupler 32 formed from a photo-diode 32a and a phototransistor 32b, a first resistor 33, and a second resistor 34.

The current detecting diode 31 is connected in series to a supply line for the current (i) from the rectification section 13 to the switching power supply section 14. The current detecting diode 31 is connected at the anode thereof to the rectification section 13 and connected at the cathode thereof to the primary side of the switching power supply section 14. Since the current detecting diode 31 is connected such that the direction from the rectification section 13 to the switching power supply section 14 is the forward direction thereof, when current flows through the current detecting diode 31 in the forward direction, a forward voltage of a fixed value is generated. It is to be noted that the forward voltage generated at the current detecting diode 31 is sufficiently higher than the driving voltage for the photo-diode 32a.

The photo-diode 32a of the photo-coupler 32 is connected at the anode thereof to the anode of the current detecting diode 31 through the first resistor 33 and connected at the cathode thereof to the cathode of the current detecting diode 31. The phototransistor 32b of the photo-coupler 32 has an npn configuration and is connected at the emitter thereof to the ground and at the collector thereof to the positive power supply through the second resistor 34. The synchronization pulse (P) is outputted from the collector of the phototransistor 32b. It is to be noted that the positive power supply is the DC power supply outputted from the switching power supply section 14.

The current detection section 16 having such a configuration as described above operates in the following manner. When the current (i) flows to the current detecting diode 31, the photo-diode 32a is turned ON and emits light. The phototransistor 32b receives the light emitted from the photo-diode 32a and is turned ON. Since the collector side of the phototransistor 32b is pulled up by the positive power supply, when the phototransistor 32b is in an ON state, it outputs a low output signal, but when the phototransistor 32b is in an OFF state, it outputs a high output signal. In other words, the current detection section 16 outputs a synchronization pulse (P) which has the low level when the current (i) flows to the current detecting diode 31 but has the high level when the current (i) does not flow to the current detecting diode 31. In this manner, the current detection section 16 can output the synchronization pulse (P) isolated from the primary side of the switching power supply section 14 through the use of the photo-coupler 32. It is to be noted that the current detecting diode 31 of the current detection section 16 may be replaced, for example, by a coil to detect the current (i).

Referring back to FIG. 1, the control section 17 monitors the synchronization pulse (P) outputted from the current detection section 16 and generates a detection pulse (r) to be conveyed to the electronic equipment of the following stage when the generation of the synchronization pulse (P) stops for more than a predetermined period of time, that is, when the period within which the synchronization pulse (P) has the high level continues for more than the predetermined period of time.

The detection pulse (r) is supplied to the system controller 21 of the electronic equipment 2.

Figure 3:
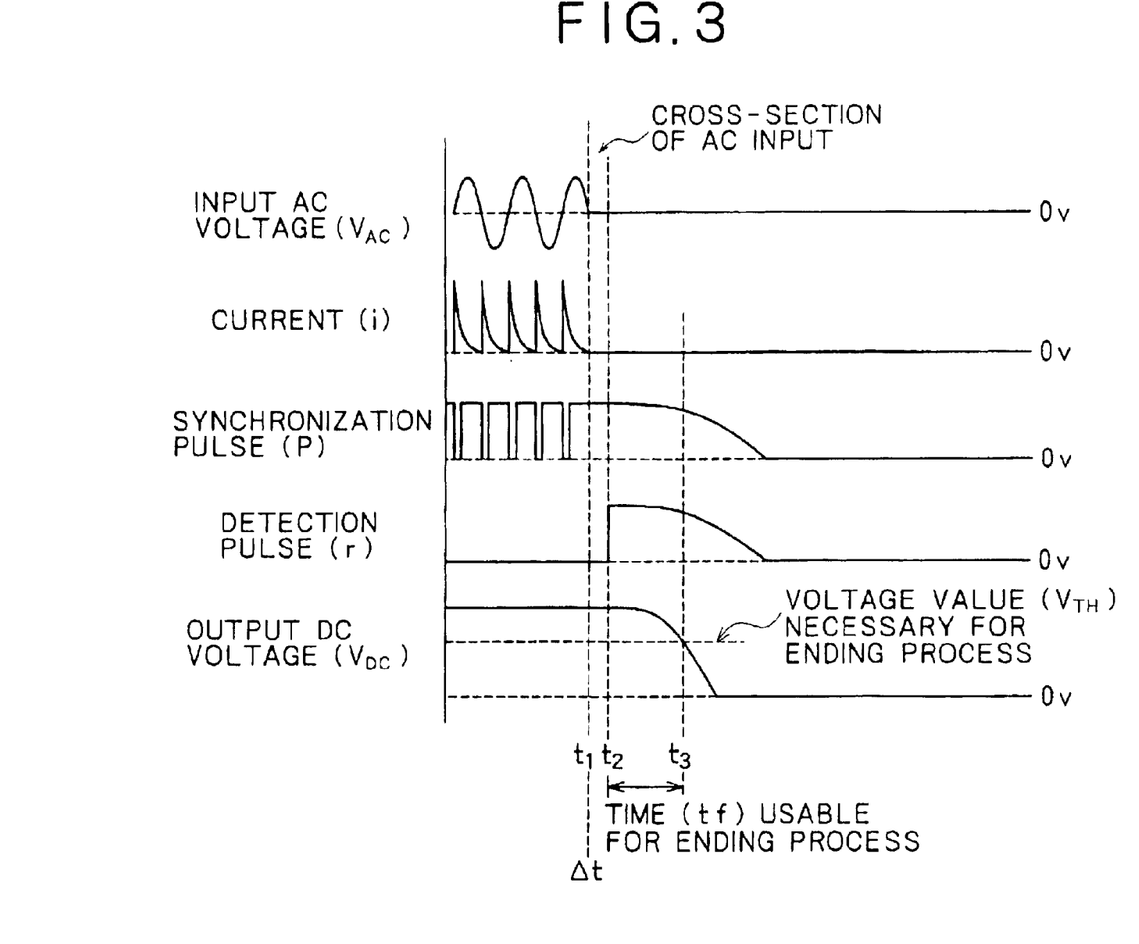
FIG. 3 is a diagram showing waveforms of voltages inputted to and outputted from the power supply device shown in FIG. 1, waveforms of a detection pulse and a synchronization pulse generated by the power supply device and a waveform of current supplied to a switching power supply section of the power supply device.

Now, operation of the power supply device 1 and the electronic equipment 2 is described with reference to FIG. 3.

Domestic power supply of a predetermined voltage and frequency is inputted to the input terminal 11. The input AC voltage ($V_{AC}$) inputted to the input terminal 11 is rectified by the rectification section 13 and supplied to the primary side coil of the transformer of the switching power supply section 14. The switching power supply section 14 switches the primary side of the transformer. Then, current (i) in the form of an impulse flows to the primary side of the switching power supply section 14 in response to the switching, and the current detection section 16 generates a synchronization pulse (P) which turns ON/OFF in synchronism with the current (i).

If the input AC voltage ($V_{AC}$) is disconnected abnormally (at time $t_1$), then also the supply of the current (i) stops, and also the generation of the synchronization pulse (P) synchronized with the current (i) stops. However, also after the supply of the input AC voltage ($V_{AC}$) stops, since residual power is held in the switching power supply section 14 and the primary side capacitor 15, the switching is continued for a little while, and the output DC voltage ($V_{DC}$) continues to be outputted to the secondary side of the switching power supply section 14. When the predetermined time ($\Delta t$) elapses after the generation of the synchronization pulse (P) stops, the control section 17 turns ON its detection pulse (r) (at time $t_2$). The detection pulse (r) is conveyed to the system controller 21 of the electronic equipment 2. The system controller 21 uses, in addition to an ordinary control program, a program for detecting a rising edge of the detection pulse (r) and performing an ending process such as storage and backup of process data of the operation circuits 22. Thus, when the detection pulse (r) turns ON, the system controller 21 starts up the program to perform the ending process for the equipment.

As described above, the power supply device 1 directly monitors the current (i) flowing to the switching power supply section 14 to discriminate whether or not abnormal disconnection occurs. Therefore, the power supply device 1 can convey abnormal disconnection to the electronic equipment 2 side before the output of the output DC voltage ($V_{DC}$) drops and consequently can notify the electronic equipment 2 of the abnormal disconnection very quickly. From this, the period of time (tf), which can be used for the ending process by the electronic equipment 2, from the time ($t_2$) at which the detection pulse (r) turns ON to the time ($t_3$) at which a voltage value $V_{TH}$ necessary to perform the ending process is reached, can be increased in the power supply device 1. Consequently, the power supply device 1 can cope with an electronic equipment with which the time for the ending process is comparatively long such as a personal computer or a digital broadcast receiver.

Further, with the power supply device 1, since a detection signal is generated based on the DC current (i) supplied to the switching power supply section 14, it can be isolated from the primary side of the switching power supply section 14 by an isolation circuit of a simple configuration such as, for example, an isolation circuit composed of a photo-diode and a phototransistor. Therefore, with the power supply device 1, the circuit area and the power consumption of the current detection section 16 can be reduced.

It is to be noted that, while the embodiment described above to which the present invention is applied is a power supply device to which power from a domestic power supply is inputted, the present invention can be applied not only to a power supply device which uses a domestic power supply as the input power supply therefor, but also to a power supply device which uses a higher voltage power supply or the like as the input power supply therefor.

Further, while the embodiment of the present invention described above is a power supply device to which an AC voltage is inputted and which inputs a DC voltage obtained by rectification of the AC voltage by means of a rectification circuit to a switching power supply section, the power supply device to which the present invention is applied may not receive an AC voltage but directly receive a DC voltage.

While a preferred embodiment of the present invention has been described using specific terms, such description is for illustrative purposes only, and it is to be understood that changes and variations may be made without departing from the spirit or scope of the following claims.

What is claimed is:

1. A power supply device for supplying a stabilized output DC voltage to an electronic equipment having a controller for controlling said electronic equipment, said power supply, comprising:

a rectification section for rectifying an input AC voltage;

a primary side capacitor for smoothing an output voltage from said rectification section;

a switching power supply section for receiving a DC voltage from said primary side capacitor as an input DC voltage at a primary side thereof, switching the inputted DC voltage and generating said stabilized output DC voltage at a secondary side thereof isolated from the primary side;

a current detection section comprising a current detector, and a photo-coupler having a photodiode connected parallel to said current detector via a resistor and a phototransistor supplied by said stabilized output DC voltage via a resistor, wherein said current detector connected between said rectification section and said primary side of said switching power supply section detects a supply current supplied from said rectification section, and generates a voltage enough for turning on said photodiode, and wherein said phototransistor generates a synchronization signal isolated from said primary side in response to said turning on of said photodiode; and a control section monitors said synchronization signal outputted from said current detection section, generates a detection signal when said synchronization signal stops for more than a predetermined period of time, and outputs said detection signal to said controller;

wherein said controller of said electronic equipment performs an operation ending process of said operation circuit in response to the detection signal from said control section.

2. An electronic equipment having a power supply for converting an input AC voltage into an output DC voltage, an operation circuit for operating using the output DC voltage outputted from said power supply as a voltage source, and a controller for controlling said operation circuit, said power supply, comprising:

a rectification section for rectifying an input AC voltage;

a primary side capacitor for smoothing an output voltage from said rectification section;

a switching power supply section for receiving a DC voltage from said primary side capacitor as an input DC voltage at a primary side thereof, switching the inputted DC voltage and generating a stabilized output DC voltage at a secondary side thereof isolated from the primary side;

a current detection section comprising a current detector, and a photo-coupler having a photodiode connected parallel to said current detector via a resistor and a phototransistor supplied by said stabilized output DC voltage via a resistor, wherein said current detector connected between said rectification section and said primary side of said switching power supply section detects a supply current supplied from said rectification section, and generates a voltage enough for turning on said photodiode, wherein said phototransistor generate a synchronization signal isolated from said primary side in response to said turning on of said photodiode; and a control section monitors said synchronization signal outputted from said current detection section, generates a detection signal when said synchronization signal stops for more than a predetermined period of time, and outputs said detection signal to said controller;

wherein said controller performs an operation ending process of said operation circuit in response to the detection signal from said control section.

* * * * *